Feb. 9, 1932.　　D. C. BEIDLER ET AL　　1,844,113
STAND FOR CAMERAS AND THE LIKE
Original Filed April 20, 1927　　5 Sheets-Sheet 1
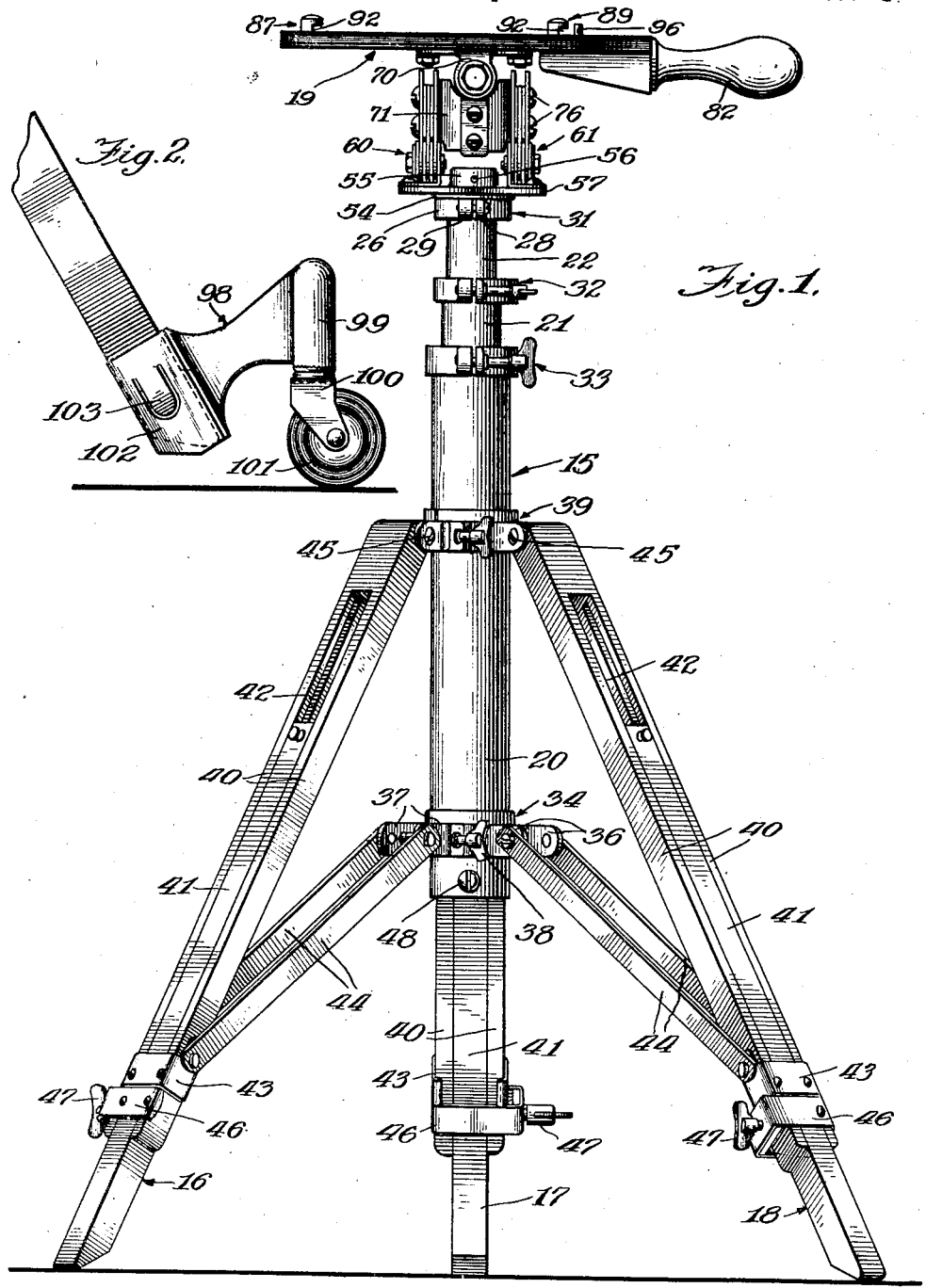
Inventor:
Donald C. Beidler,
Antonius J. Viken,
By Thos. A. Banning Jr. atty.

Feb. 9, 1932.   D. C. BEIDLER ET AL   1,844,113
STAND FOR CAMERAS AND THE LIKE
Original Filed April 20, 1927   5 Sheets-Sheet 2
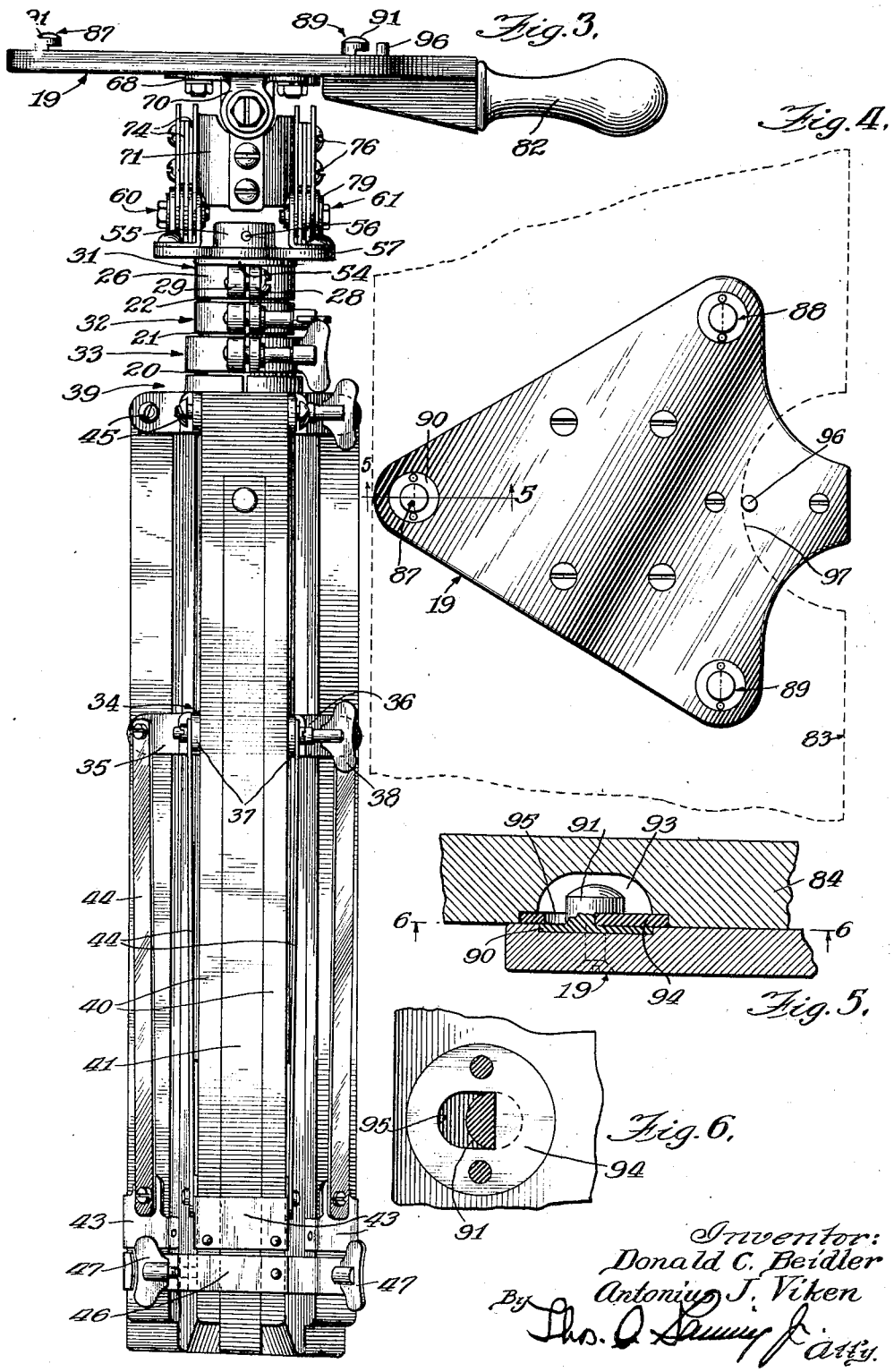
Inventor:
Donald C. Beidler
Antonius J. Viken
By Thos. O. Lunny, Atty.

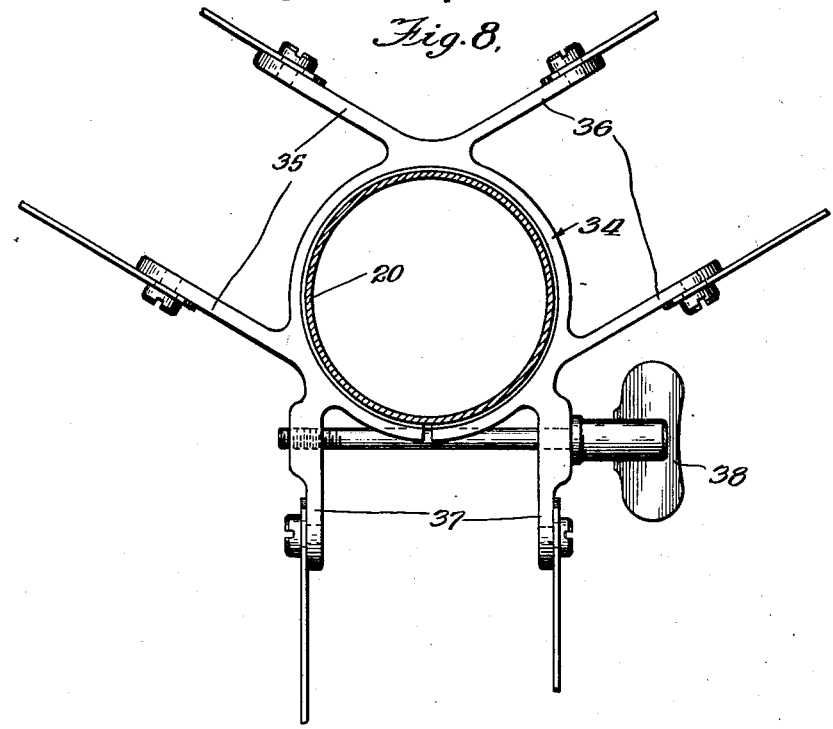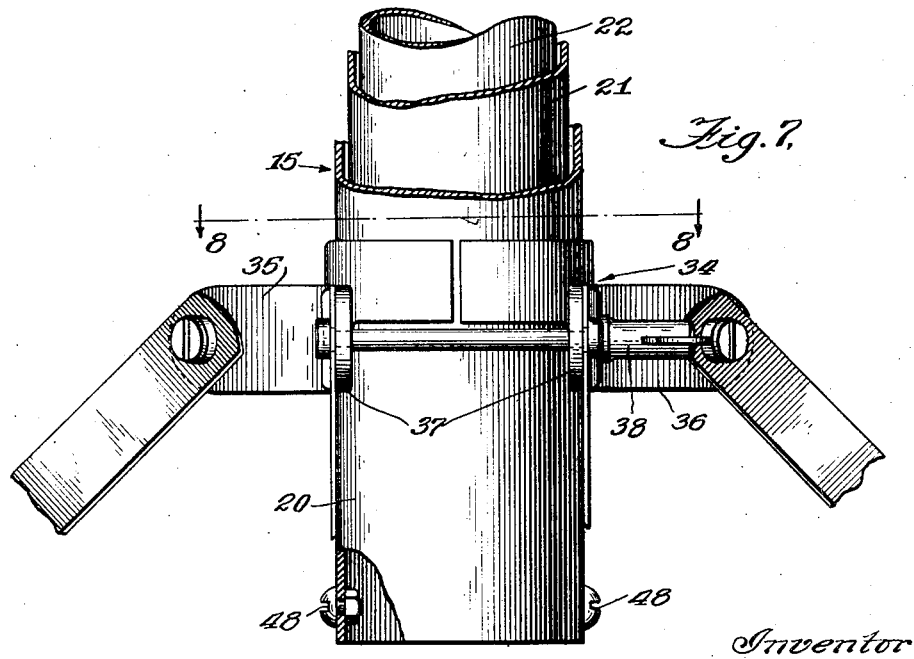

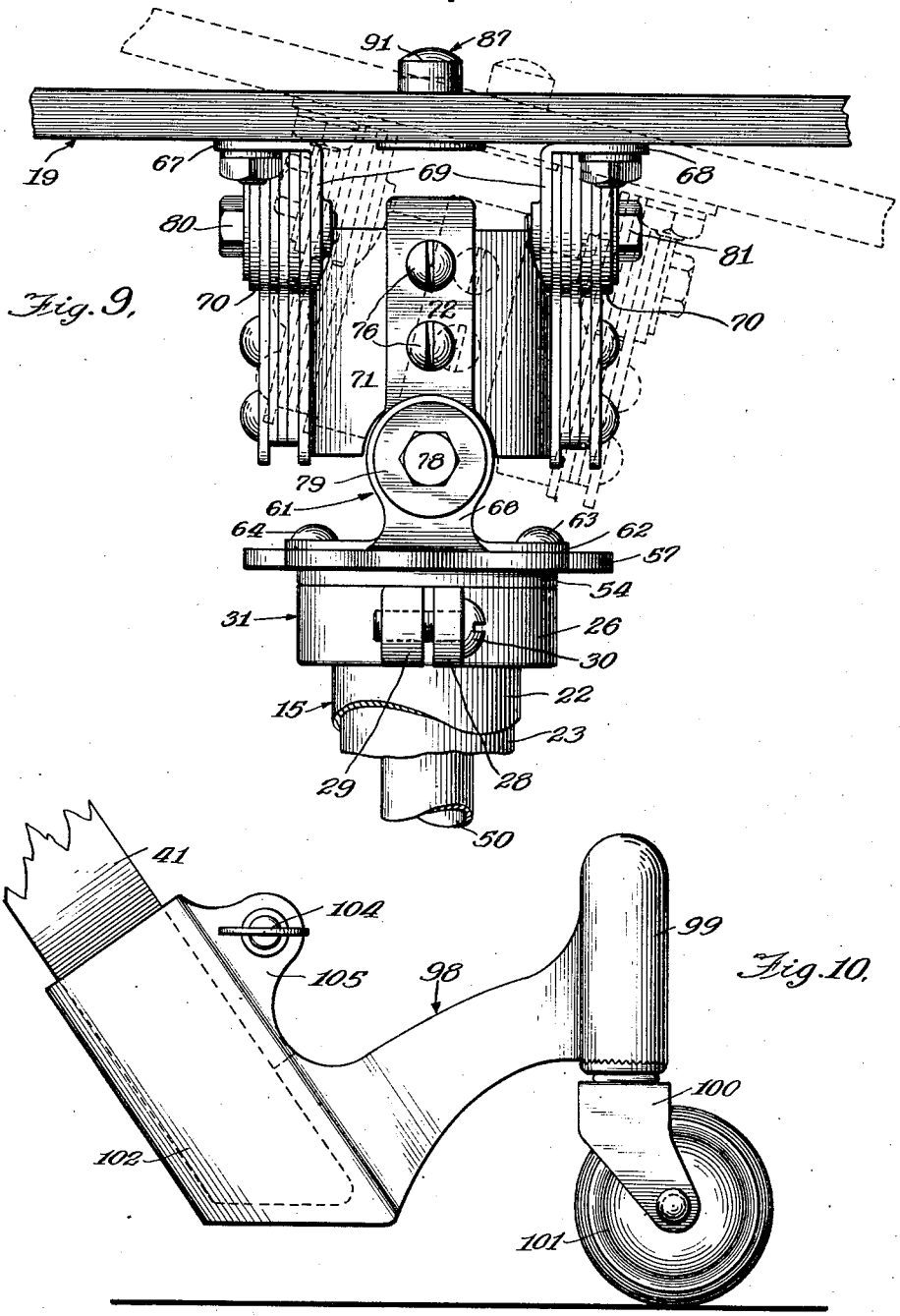

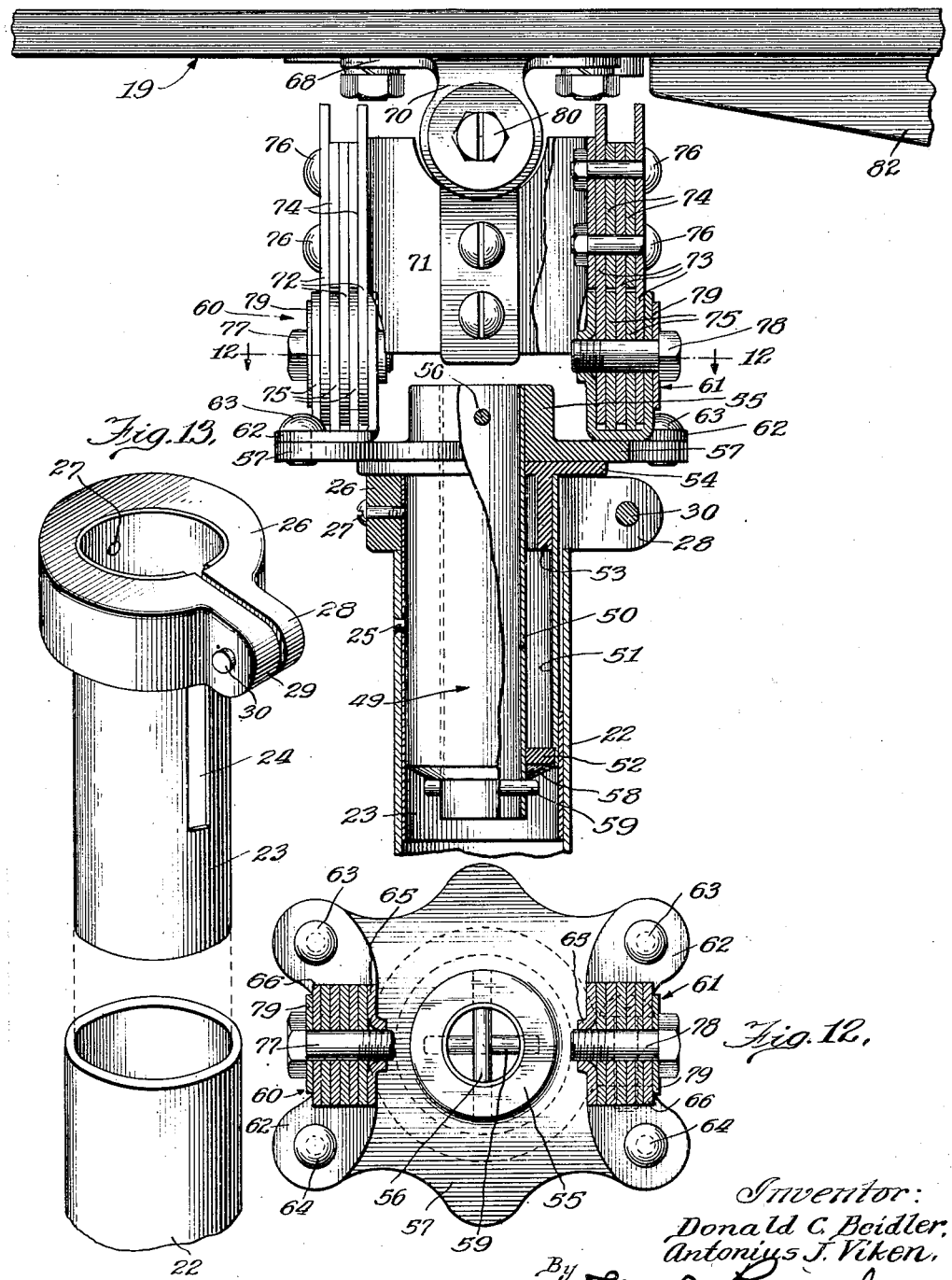

Patented Feb. 9, 1932

1,844,113

UNITED STATES PATENT OFFICE

DONALD C. BEIDLER AND ANTONIUS J. VIKEN, OF MANHASSET, NEW YORK, ASSIGNORS TO SAID DONALD C. BEIDLER, AS TRUSTEE

STAND FOR CAMERAS AND THE LIKE

Application filed April 20, 1927, Serial No. 185,179. Renewed June 30, 1931.

This invention has to do with improvements in stands for cameras and the like. The stand herein disclosed is especially adapted for supporting cameras which must be moved around with relatively quick and yet certain movements so that they can be directed into different directions as need be. In this connection the stands herein disclosed are particularly intended for supporting portrait cameras and the like although it will be understood that we do not intend to limit ourselves to this or any other particular class of service except as we may do so in the claims.

One of the objects of the invention is to provide a camera stand which is particularly well adapted for outdoor work and where the surface of the ground is irregular and not necessarily level. The stand herein disclosed is so constructed that it can be used on either irregular or unlevel ground and at the same time provide a support for the camera whereby the camera itself can at all times be maintained with its central axis standing in a vertical plane. At the same time the stand herein disclosed is so arranged that the camera can be turned around or tilted up and down with very great freedom of movement while complying at all times with the desideratum already referred to.

A further feature of the invention relates to the provision of a very simple and yet effective means for firmly clamping the camera base to the platform of the stand itself so as to avoid danger of the camera falling off of the stand or sliding into improper positions thereon. At the same time this attaching means is so arranged that the camera can very readily be disconnected from the platform of the stand itself when the operator so desires.

A further feature of the invention relates to the provision of an element whereby the camera supporting platform can be directed by the use of a hand grip of convenient form thus enabling the operator to immediately and definitely point the camera in the proper direction or to follow a moving object such as a child at play.

A further feature of the invention relates to the provision of improved form of telescopic support for the camera platform so that the elevation of the same can be very readily changed as desired. In this connection we have provided an improved clamping means involving the use of co-operating telescoping tubes; and a further feature of the invention is to provide such a construction that the main body of these tubes may be made of relatively light, although relatively non-resilient material such as aluminum, whereas the clamping portion thereof is made of more resilient material such as brass tubing, thus securing the additional benefit of lightness of structure combined with sufficient resiliency to operate properly.

Another feature of the invention relates to the provision of an improved form of caster unit which can be very readily attached to or detached from the lower ends of the legs of the stand, thus adapting the latter for use either on ordinary floors or directly on the ground.

Another feature of the invention relates to the provision of a complete structure which can be very readily folded up and telescoped into a very small compact space so that it can be readily packed up or carried around.

A further object is to provide a structure of this kind which is simple in form, made from relatively few parts, which can be cheaply manufactured and assembled, which shall be rugged and durable, and in other respects to generally improve devices of this character.

Other objects and uses of the invention will appear from a detailed description of the same which consists in the features of construction and combinations of parts hereinafter described and claimed.

In the drawings:

Fig. 1 shows a side elevation of a camera stand embodying the features of our present invention, the same being opened out into working position;

Fig. 2 shows a fragmentary side view of the lower end of one of the tripod legs having attached thereto a removable caster embodying the features of the present invention;

Fig. 3 shows a side view corresponding to

Fig. 1 but with the tripod legs folded up and the structure telescoping together;

Fig. 4 shows a plan view corresponding to Fig. 3;

Fig. 5 shows a fragmentary section on the line 5—5 of Fig. 4 looking in the direction of the arrows but on enlarged scale and with the camera base in place on the platform stand;

Fig. 6 shows a fragmentary section on the line 6—6 of Fig. 5 looking in the direction of the arrows;

Fig. 7 shows a fragmentary vertical elevation of the central post together with the clamping sleeve which is vertically adjustable thereon;

Fig. 8 shows a horizontal section on the line 8—8 of Fig. 7 looking in the direction of the arrows, the inner tubes or sleeves being removed;

Fig. 9 shows a fragmentary elevation of the upper end of the stand, being at right angles to Figs. 1 and 3 and on enlarged scale, and showing by dotted lines the manner in which the table may be tilted about one axis;

Fig. 10 shows a fragmentary side elevation of the lower end of one of the legs of the tripod having attached thereto a caster of modified construction as compared to Fig. 2, Fig. 10 being on enlarged scale as compared to Fig. 2;

Fig. 11 shows a view similar to that of Fig. 9 but at right angles thereto and shows a portion of the structure in vertical section;

Fig. 12 shows a horizontal section on the line 12—12 of Fig. 11 looking in the direction of the arrows; and Fig. 13 shows a perspective view of the upper end of the central telescoping post.

The stand herein disclosed includes a central telescoping post 15 together with the three legs 16, 17 and 18, and the head or the platform section 19. Preferably, the post 15 is of telescoping construction and preferably the legs 16, 17 and 18 may be spread out into a tripod of adjustable size or may be folded up close to the central post so as to bring the entire structure into a very compact form. Preferably, also the head or platform member 19 may be tilted in different directions on a sort of universal joint support so that it may be readily manipulated to point the camera wherever desired.

More particularly the central post 15 includes the three tubes 20, 21 and 22 which are telescoped together. These posts are preferably of light tubing such as relatively thin aluminum, but any other suitable material may be substituted.

In order to clamp the different tubular sections in adjusted position with respect to each other we have provided a split sleeve arrangement wherein the necessary clamping action may be secured without having to materially deflect the aluminum tubing itself. Such arrangement is illustrated more in detail in Fig. 13. In this case one of the aluminum tubes, for example the upper tube 22, is provided with a tubular liner 23 of relatively resilient metal such as brass, which liner sets snugly into the upper end of the aluminum tube and reaches down only part way therein. This liner is split downwardly from its upper end as shown at 24 in Fig. 13 a sufficient distance so that its upper end can be readily compressed owing to its elasticity. This liner is riveted to the aluminum tube 22 by a rivet 25 placed opposite to the position of the slot 24. The liner reaches a short distance above the upper edge of the aluminum tube and receives a collar 26 which is secured to the liner by means of a screw 27. This collar is split and is provided with the lugs 28 and 29 which receive a wing nut or the like 30 by which said lugs may be drawn together in order to compress the split sleeve.

By means of the foregoing arrangement the necessary contracting action may be provided in order to make it possible to establish the desired clamp, and at the same time use may be made of an aluminum tubing for most of the length of the post, thus combining lightness with the necessary resiliency and clampability.

Structures such as just explained may be used at the points 31, 32 and 33 where the upper ends of the tubes are to be clamped.

There is mounted upon the lower tube 20 a split sleeve 34 (see Fig. 8) having the pairs of parallel lugs 35, 36 and 37 located at positions 120° apart. A wing nut 38 extends between the lugs 37 so that the sleeve 34 may be clamped at any desired position. There is another similar sleeve 39 on the tube 20 above the position of the sleeve 34.

Each of the legs 16, 17 and 18 comprises upper and lower slidably telescoping sections 40 and 41 as best shown in Figs. 1 and 3. The upper section 40 is slotted as shown at 42 and receives the lower section 41, and the two sections are preferably tongued and grooved together as clearly evident in Fig. 1.

A collar 43 secured to the lower portion of the upper leg section 40 serves as a means for attachment thereto of a pair of links 44 which links have their outer ends pivoted to the collar 43 and their inner ends pivoted to the lugs 35, 36 or 37 as the case may be. The upper end of each of the upper leg sections 40 enters between the companion pair of lugs 35, 36 or 37 as the case may be of the upper sleeve 39 to which lugs it is pivoted as shown at 45 in Fig. 1.

Another clamping collar 46 is placed around or across the lower ends of each of the outer sections 40 which may be thereby clamped together as by a wing nut 47 as shown in Fig. 1. In this way the telescoping leg sections may be clamped in any adjusted position with respect to each other.

It is thus evident that by proper manipulation of the two sleeves 34 and 39 on the tubular member 20 the angular spread of the legs may be adjusted and at the same time the elevation of the tubular member 20 with respect to the legs may be adjusted within limits. Preferably one or more stop screws or abutments 48 are connected to the lower portion of the tube 20 so as to prevent the sleeve 34 from sliding off of the same; and the presence of the collar 26 at the point 33 on the upper end of the tube 22 serves to limit movement in that direction.

The upper end of the telescoping member 15 carries the platform 19 by which the camera is directly supported. This construction is shown in detail particularly in Figs. 9, 11 and 12. For this purpose there is provided a neck member 49 which sets down into the upper end of the upper tubular section 22. This neck member includes inner and outer tubes 50 and 51 spaced at their lower ends by a ring 52 and spaced at their upper ends by a ring member 53. This ring member 53 also has the outwardly projecting flange 54 which seats against the upper face of the split ring 26 on the upper end of the tubular member 22.

The inner tube 50 is longer than the outer tube 51. On its upper projecting end the inner tube 50 carries a collar 55 secured thereto by a pin 56, which collar has the outwardly projecting flange 57 resting against the flange 54. A spring washer 58 is placed between the lower projecting end of the inner tube 50 and the ring 52 already referred to, said ring 52 preferably being set against a shallow shoulder at the lower end of the outer tube 51. The parts are drawn together under a certain amount of tension and then a cross pin 59 is set into place, said cross pin reaching through the inner tube 50 just below the position of the spring washer 58, and serving in conjunction with the cross pin 56 to hold the parts under a sufficient longitudinal or axial tension to create the desired amount of friction between the flanges 54 and 57 and between the pin 59 and spring washer 58. This friction is sufficient to prevent the flange 57 from rotating too easily with respect to the tubular telescoping post, and at the same time there is sufficient freedom of movement provided for to allow the operator to readily turn the camera in any direction.

The clamping action established by the split collar 26 at the upper end of the upper tubular section 22 is taken up by the internal ring 53 of the member 49 so that the aforementioned frictional adjustment is not affected by this clamping action of the split collar 26.

The flange 57 is of the general form shown in Fig. 12. Secured to it at opposite sides are the clamping members 60 and 61 (see Figs. 11 and 12). Each of these clamping members includes a plate 62 which is riveted to the flange 57 as shown at 63 and 64, and also includes the inner and outer upstanding lugs 65 and 66 respectively.

The platform 19 itself is preferably of triangular form as shown in Fig. 4. Secured to the bottom of this platform 19 are the plates 67 and 68, and the inner and outer lugs 69 and 70 respectively reach down from each of these plates as best shown in Fig. 9.

A universal ring 71 is located between the positions of the platform 19 and the flange 57. This ring has flattened surfaces at four equidistant points. A plurality of sets of plates 72 and 73 are located at the opposite sides of the ring 71 and reach down from said ring, said plates being separated at their upper ends by washers 74 and at the lower ends by other washers 75. The upper ends of said plates together with their washers are drawn rigidly to the ring 71 by the through bolt 76. The lower ends of said plates together with the washers 75 are located between and are pivoted to the lugs 65 and 66 on the flange 57, to which they are pivoted by means of the through bolts 77 and 78 (see Figs. 11 and 12). If desired composition washers 79 may be placed against the outside faces of the lugs 66 just referred to so as to improve the action of the parts.

From the foregoing it will be observed that the universal ring 71 is allowed to swing back and forth with respect to flange 57 about an axis established by the bolts 77 and 78. Reference to Fig. 9 in particular will disclose that there is a similar connection established between the universal ring 71 and the platform 19 through the medium of the plates 67 and 68. This connection includes the bolts 80 and 81 which are in line with each other but the axis of said bolts is located at 90° removed from the axis of the bolts 77 and 78. Thus the combination already explained establishes what amounts to a universal joint connection between the flange 57 and the platform 19 so that said platform can be in effect rocked into all angular positions with respect to the telescoping post, and within the necessary range of limits.

Owing to the multiple plate and washer construction it is possible to secure a sufficient amount of clamping effect to compel the platform 19 to remain in any adjusted position with a sufficient retention to meet the requirements of the device, but at the same time a tight action is avoided such as would prevent a smooth and easy as well as regular movement of adjustment.

It will be noted that the universal ring 71 is notched on its upper and lower edges at the positions of the axial connections aforesaid so that said ring may be made of sufficient vertical dimension to provide for ready attachment of the plates thereto, and at the same time the positions of the two crossing axes may be brought relatively close together so as to improve the nature of the adjustment.

As a matter of convenience the platform 19 is triangular in form as already explained and as shown in Fig. 4. The axis established by the bolts 80 and 81 lies parallel to one of the edges of said triangle, and the axis established by the bolts 77 and 78 lying at right angles thereto, extends through the apex of the triangle, and through the middle of the opposite broad side. To this broad side is connected a pistol or other suitable handle grip 82 as best shown in Figs. 1 and 3. By means thereof the platform can be readily tilted or turned into any desired position.

The camera stand herein disclosed may be used for the support of any desired form of camera, but preferably one wherein the camera has a flat bottom surface. Such a camera is shown partly in outline by the dotted lines 83 in Fig. 4. In order to attach the camera to the platform 19 use may be made of the construction which we will now explain in detail.

The bottom of the platform is shown at 84 in Figs. 5 and 6. Located at the three corners of the triangular platform are the studs 87, 88 and 89 (see Fig. 4). Each of these studs includes a circular plate 90 which is set down into the face of the platform 19 and flush therewith, so that only the lug 91 thereof reaches above the surface of the platform. All of the projecting lugs 91 are recessed facing towards the rear of the platform 19, so as to provide the recess 92 (see Fig. 1 in particular). These recesses reach down to the face of the platform 19 itself.

There are formed in the bottom face of the camera plate 84, sockets such as 93 in Fig. 5, said sockets being closed at their lower ends by the plates 94. Said plates are countersunk into the bottom 84 of the camera as shown in Fig. 5 so that the bottom surface of the camera may come flush against the top surface of the platform 19.

Each of the plates 94 is provided with a hole 95 of proper diameter to allow the lug 91 to pass up therethrough, and then the camera may be shifted sidewise a distance equal to substantially one half the diameter of the lugs 91 so as to move the edges of the plates 94 into the recesses 92 of the lugs. (The plates 94 being of the proper thickness to permit of such action.)

All of the parts are so proportioned that the camera can be set down onto the platform and then shifted forward the aforesaid distance, whereupon all of the lugs will be brought into locking engagement as explained. As long as the camera is retained in this slightly shifted position it cannot be disconnected from the platform. In order to retain it in this position we provide a pin 96 which works in a suitable socket in the platform and is normally spring pressed above the surface of the platform as shown in Figs. 1 and 3, in particular. The edge of the camera base is shown at 97 in Fig. 4, this being the position which it occupies when the parts are locked together.

In order to lock the camera to the platform it is only necessary to set the camera down onto the platform in the proper location so that the lugs 91 will pass up through the holes 95, and in such location the bottom of the camera will bear against the pin 96 and depress the same until flush with the surface of the platform 19. Thereupon the camera may be shifted forward slightly, the plates 94 will lock into the notches 92 of the lugs, and then the pin 96 will snap up behind the edge 97 of the camera. The camera will then be held locked to the platform until the pin 96 is purposely depressed so as to allow the camera to be slipped back a sufficient distance to disengage the parts.

In some cases it may be found desirable to use casters on the lower ends of the tripod legs. One form of a removable caster is illustrated in Fig. 2. The same includes a bracket 98 having at one end the socket 99 to receive the pin of the yoke 100 of the caster wheel 101. At its opposite end the bracket 98 carries a square socket 102 which extends at an angle with respect to the pin socket 99. The socket 102 is of proper size to receive the lower end of the telescope lug member 41. In the construction shown in Fig. 2 the socket 102 is provided with a spring ear 103 which may snap into a suitable recess in the lower end of the leg so as to lock the caster fixture thereto. The caster fixture may thereafter only be removed by the use of a suitable tool such as a screw driver by means of which the ear 103 may be pried away from the socket.

In the modified construction shown in Fig. 10 the caster fixture also has the socket 102 which receives the lower end of the tripod leg, but in this case the fixture 98 is clamped in place by a wing nut 104 working through the ears 105 of the fixture 98.

While we have herein shown and described only certain embodiments of the features of our present invention still we do not intend to limit ourselves to the same except as we may do so in the claims.

We claim:

1. In a device of the class described a vertically adjustable post comprising a series of telescoping tubular sections of progressively decreasing sizes, each of said tubular sections including an outer tubular shell of aluminum, together with a thin, tubular clamping bushing of relatively resilient material seated into the upper end thereof and projecting above said upper end and of proper size to receive the next succeeding tubular member in telescoping fashion, said bushing being split vertically commencing at its upper end and extending downwardly a substantial distance to thereby provide a relatively resilient and compressible clamping lining, a connection between said lining and the aluminum tube at a position substantially opposite to the split aforesaid, and a clamping sleeve around the upper end of the bushing which projects above the tubing, whereby said bushing may be clamped directly and firmly against the next succeeding telescoping member without deflection of the aluminum, tubing, substantially as described.

2. In a device of the class described, a vertically adjustable post, said post comprising a series of telescoping tubular sections of progressively decreasing size, each of said tubular sections including an outer tubular shell, together with a thin tubular clamping bushing of relatively resilient material seated into the upper end thereof and projecting above said upper end and of proper size to receive the next succeeding tubular member in telescoping fashion, said bushing being split vertically commencing at its upper end and extending downwardly a substantial distance to thereby provide a relatively resilient and compressible clamping lining, and a clamping sleeve around the upper end of the bushing which projects above the tube, whereby said bushing may be clamped directly and firmly against the next succeeding telescoping member and without deflection of the outer tubing, substantially as described.

DONALD C. BEIDLER.
ANTONIUS J. VIKEN.